United States Patent [19]

Field et al.

[11] 4,026,382
[45] May 31, 1977

[54] REPETITIVE DETONATION SEISMIC SURVEYING METHOD AND APPARATUS

[75] Inventors: Harold S. Field; Donald K. Mitchell, both of Tulsa, Okla.

[73] Assignee: Daniel Silverman, Tulsa, Okla.

[22] Filed: Oct. 4, 1974

[21] Appl. No.: 512,035

Related U.S. Application Data

[63] Continuation of Ser. No. 281,716, Aug. 18, 1972, abandoned.

[52] U.S. Cl. ............................ 181/117; 181/116; 181/401; 175/50
[51] Int. Cl.² ...................... G01V 1/12; G01V 1/04
[58] Field of Search .......... 181/106, 116, 117, 119, 181/401; 340/12 SD, 386; 175/4.55, 40, 71

[56] References Cited
UNITED STATES PATENTS

| | | | |
|---|---|---|---|
| 1,627,991 | 5/1927 | Owen | 175/4.55 |
| 2,073,493 | 3/1937 | Salvatori | 181/116 |
| 2,353,484 | 7/1944 | Merten et al. | 181/117 |
| 2,614,804 | 10/1952 | Carlisle | 181/116 |
| 2,721,617 | 10/1955 | Piety | 181/116 |
| 2,816,618 | 12/1957 | Piety | 181/112 |
| 3,623,570 | 11/1971 | Holloway | 340/12 SD |
| 3,752,256 | 8/1973 | Mollere | 181/117 |

*Primary Examiner*—Nelson Moskowitz
*Attorney, Agent, or Firm*—Daniel Silverman

[57] ABSTRACT

This invention describes an apparatus and method for generating seismic waves in the earth for seismic geophysical prospecting. It involves a slender pipe open at the lower end, which can be driven into the earth to a shallow depth. The upper end is closed. Means are provided for introducing oxygen and acetylene through a pair of control valves and check valves, for a selected period of time. The oxygen and acetylene are mixed in the pipe and flow downward through the pipe and through the perforations into the earth, and fill the voids and fissures in the shallow sediments. Means are provided in the top end of the pipe to detonate the gas mixture. The detonation wave travels down the pipe and eventually reaches the openings at the lower end, and detonates the gas in the pores and fissures of the earth. The resulting explosion opens up the fissures and provides a larger void space than was there before. The seismic waves generated by the explosion are detected in the normal manner by means of transducers, cables, amplifiers, recorders, etc.

The pipe is pressed further into the ground as the result of the expansion of the void space, and the operation of filling the void space with combustible gas and detonating the gas is repeated, until on each succeeding operation, the volume of gas introduced becomes large enough to create a seismic wave of sufficient intensity to provide a satisfactory seismic record.

16 Claims, 6 Drawing Figures

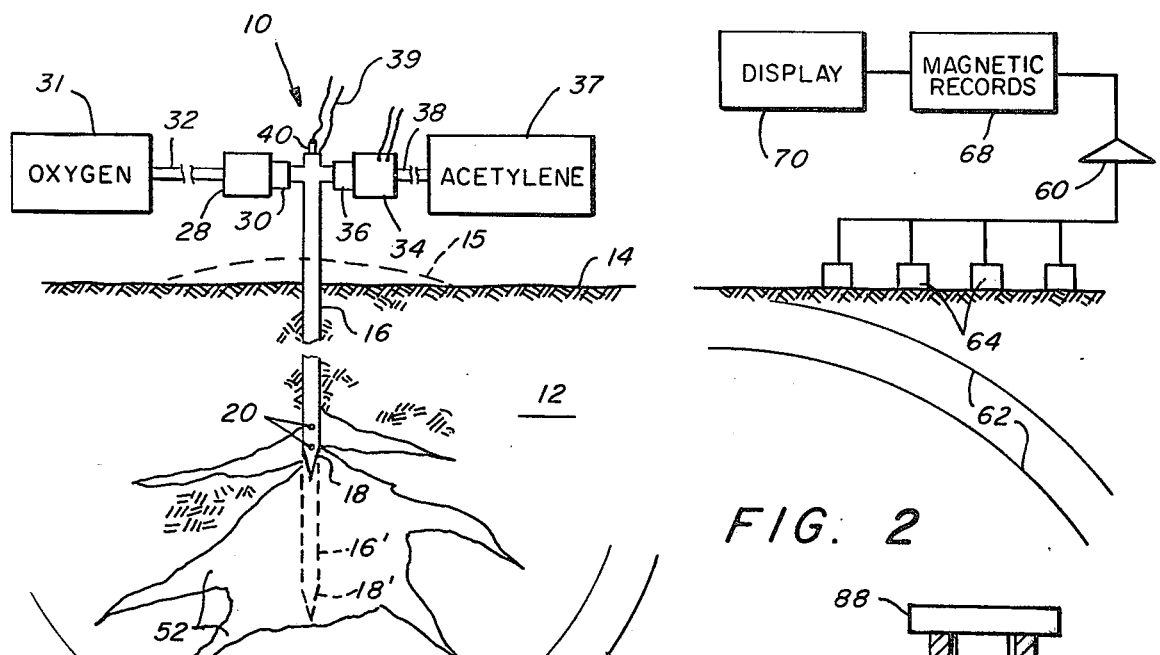
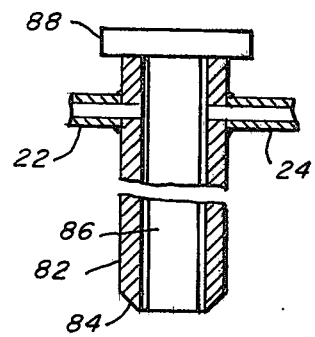
FIG. 2
FIG. 3
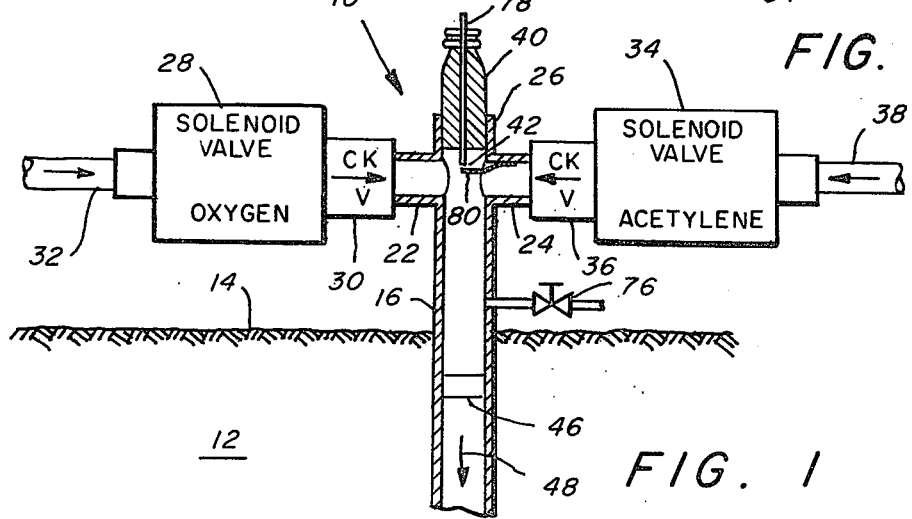
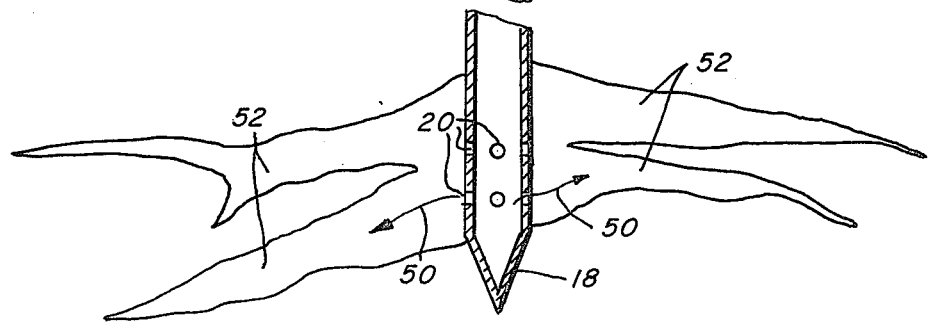
FIG. 1

REPETITIVE DETONATION SEISMIC SURVEYING METHOD AND APPARATUS

This application is a continuation of our copending application, Ser. No. 281,716 filed Aug. 18, 1972, entitled "Repetitive Detonation Seismic Serveying Method and Apparatus," and now abandoned.

BACKGROUND OF THE INVENTION

This invention lies in the field of seismic exploration. More particualrly, it lies in the field of the generation of seismic waves in the earth. Still more particularly, it is concerned with a small light weight apparatus that can be used for generating elastic waves in the earth.

In the prior art the seismic method of geophysical prospecting has utilized a number of different sources of elastic waves. One of these utilizes the detonation of a solid explosive material which is generally positioned at a considerable depth in the earth in a shot hole which is tamped with water to provide a maximum coupling of the exposive material with the earth.

In another method a mixture of explosive gases is used to fill an expansible container which rests on the earth. A first of two relatively movable parts of the container is in direct contact with the earth. The second part, which carries a large mass is on the top of the first part. When the gas which fills the space between the two parts is exploded, the first part is impulsively driven against the earth, and creates therein the elastic wave energy that is required. While the simplicity and safety of using explosive mixture of gases is a desirable one, the equipment is inconveniently large, heavy and expensive, so this method is not of wide application.

In offshore work, the explosion of a mixture of gases in a container, or a gun, open on the bottom and placed over the surface of the water, provides a detonation of the gas in the gun, which strikes the surface of the water and generates therein an elastic wave.

SUMMARY OF THE INVENTION

It is a primary object of this invention to provide a method of seismic geophysical operation that requires simple, light-weight, and portable apparatus, that can be easily transported in the field and utilized with a minimum number of personnel. It is a further object of this invention to use an explosion of an explodable gas mixture in the pores and fissures in the earth to provide the seismic impulses which generates the elastic waves in the earth.

These and other objects of the invention are realized and the limitations of the prior art are overcome by preparing an explosive mixture of gases in a pipe which is driven into the shallow surface of the earth. This explosive mixture of gas passes through the pipe and into the pores and fissures of the earth until a selected volume of gas mixture has been placed in the void space. The flow of gas is then stopped. The gas mixture is detonated at the top of the pipe. The detonation wave progresses down the pipe and into the earth, and detonates the explosive gas mixture previously positioned in the pores and fissures of the earth. When this gas mixture detonates it creates an explosive force which lifts the overburden and causes the fissures and pores to expand, forming a void space which is larger than the void space just prior to the explosion.

The process is then repeated, of flowing the explosive gas mixture into the enlarged void space, and again detonating this gas mixture. Because of the larger void space, more gas can be placed and therefore a larger explosive force will be provided.

Each of the seismic waves which pass into the earth and are reflected at subsurface layers and are returned to the earth's surface and are detected by transducers and recorded in the conventional manner. The seismic waves resulting from each of the separate shots are recorded. The process is repeated until the void space is sufficiently large, and the volume of gas introduced prior to detonation is sufficiently large, that a satisfactorily intense seismic wave is generated so as to provide a useful seismic record.

BRIEF DESCRIPTION OF THE DRAWINGS

These and other objects of this invention and a better understanding of the principles and details of the invention will be evident from the following description taken in conjunction with the appended drawings, in which:

FIG. 1 illustrates in cross section the detailed construction of the preferred apparatus of this invention.

FIG. 2 indicates a general view of the apparatus of this invention and depicts its use in the normal seismic exploration procedure.

FIG. 3 indicates a modification of FIG. 1.

DESCRIPTION OF THE PREFERRED EMBODIMENTS

Figure 6:
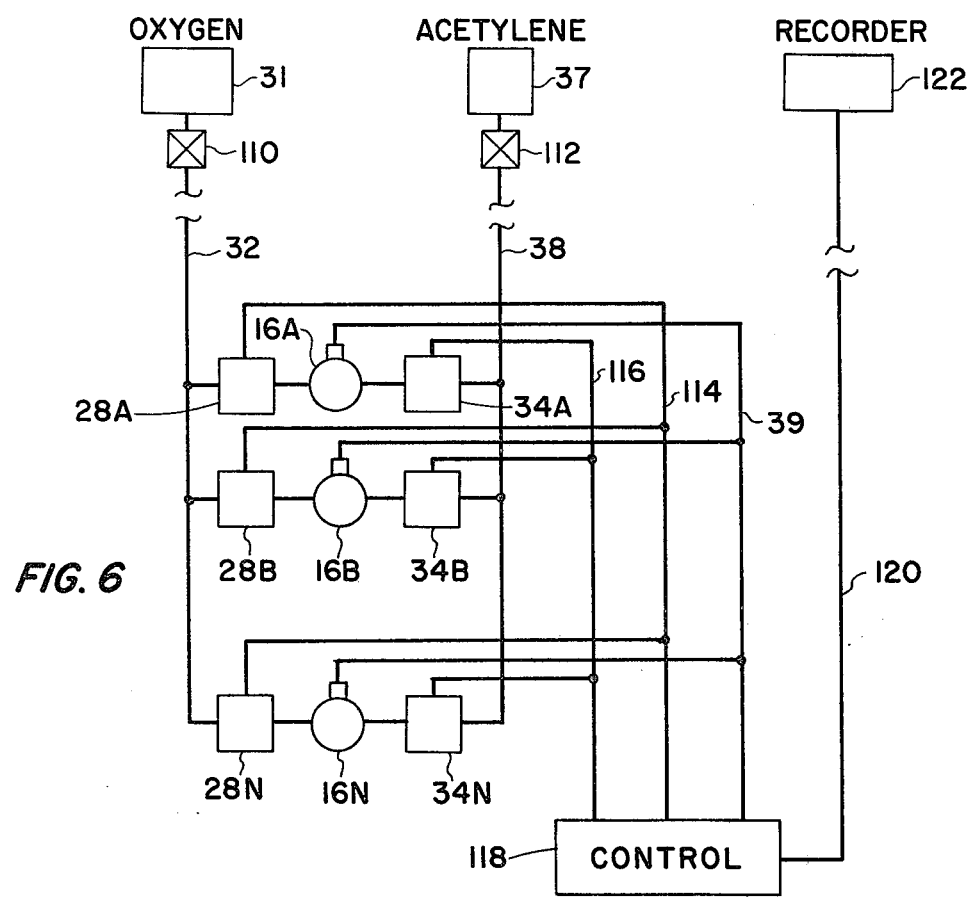
FIGS. 5 and 6 illustrate modifications of FIGS. 1 and 2, which incorporate a plurality of pipes in the earth.

Referring now to the drawings, the device which is used as the source of the seismic waves is indicated generally by the numeral 10. As shown in FIG. 1, this comprises a long, slender, thick-walled pipe 16 which has, at its bottom end, a pointed closure 18 and a plurality of holes drilled through the wall 20 near the lower end of the pipe. The upper end of the pipe is closed.

There are three points of attachment of auxiliary apparatus. These may be attached in any way desired, but are preferably joined by threaded fittings in the form of a cross at the upper end of the pipe. One arm 22 carries a valve which is preferably an electrically operated remote controlled solenoid valve 28 which contains also a check valve 30. Oxygen, air, or other oxygen-containing gas is provided by means of a tube 32 from a source 31 of such oxygen containing gas. Symmetrically placed to the oxygen arm 22 is a second arm 24 which also contains a remote controlled electrically operated solenoid valve or other type of valve 34 and including also a check valve 36. This valve is supplied by means of tube 38 with a combustible gas which may be hydrogen, certain light hydrocarbons, acetylene, etc. The tube 38 connects, as shown in FIG. 2, to a container 37 of such combustible gas.

A third connection 26 of the pipe includes a spark plug or similar device which on the application of a high potential applied to wires 39 will cause a spark to jump between the electrodes 42 inside the pipe. If there should be an explodable mixture of gas inside the pipe mixture will detonate and create a downward moving detonation wave indicated by numeral 46 progressing in the direction of arrow 48.

Referring now to FIG. 2 which shows a general cross section of the earth 12 with the surface indicated as 14, the pipe 16 is shown as being driven into the shallow layers of the earth. The point 18 is at a nominal depth, such as approximately a foot or more below the surface. There will be voids and fissures 52 in the shallow subsurface layer of the earth, which are nominally filled with air. When the valves 28 and 34 are opened, oxygen containing gas will flow from the container 31 through the tube 32 through valve 28 and check valve 30 into the pipe. Correspondingly, the combustible gas from reservoir 37 will flow through tube 38 through valve 34 and check valve 36 into the interior of the pipe 16. Here the two gases will mix, and by proper proportioning of the flow, the mixture will be detonatable. The control for the valves 28 and 34 can be any conventional controls. The valves stay open for a selected period of time, during which the gases will flow into the pipe and will mix and travel down the pipe 16 in accordance with the arrow 48, and out through the openings 20, and will flow in accordance with the arrows 50 into the fissures and porous areas 52 in the earth.

Some of these fissures will be very thin, others will be of greater volume. But, in general, at the start, the volume of porous space will be quite small so that the volume of gas flow into the earth during the flow interval will be small. At the end of this interval, the flow of gas is stopped, the gas mixture in the pipe 16 will be detonated, and the detonation wave 46 will detonate the gas in the pores 52. The explosion of gas in the earth causes the lifting of the overburden, which will form a new surface in the region of the pipe 16 which is indicated by the numeral 15.

This explosion will send out a compression wave 60 which will pass downward into the earth, and will reach a stratum 61, where part of the energy will be reflected and will move up to the surface as spherical waves 62. Here they will contact the transducers 64, which may be conventional, and will need no further explanation. The outputs of the transducer are amplified with conventional amplifier 66 and recorded at 68 in a conventional manner and displayed at 70.

The reflected waves resulting from the first explosion may be recorded. If this record is satisfactory, no further operations are needed. In general, however, because of the small volume of pore space, the volume of gas which will be available for the explosion will be too small. So a second operation will be required and mixed gas will be introduced again through the valves, which will now fill the enlarged pore space formed by the previous explosion. This larger volume of gas is then detonated and a larger explosion and higher intensity reflected waves 62 will be received and recorded, and so on.

As the volume of void space increases, the pipe 62 can be pressed deeper into the earth and therefore obtain a greater mass of overburden to tamp the explosion, and therefore get a greater seismic effect. When the volume of gas is sufficiently large so that the detonation provides a seismic wave of sufficient energy, and the record that is received is satisfactory, the operation is complete. The pipe 16 is withdrawn, and the apparatus is moved to a new shot point.

It is clear that more than one of the guns, or pipes, 16 can be used in the form of a multiple point operation as is well known in the seismic art. Thus, for example, four of the pipes may be driven into the earth at the corners of a square and simultaneously filled with explosive gas and detonated. In this way a multiplication of the elastic wave intensity can be provided which makes for a more satisfactory seismic record. In normal operation the number of shots may vary from 5–10.

We have talked of the use of air or oxygen, and various types of combustible gases. There are a number of such gases which can be used, for example hydrogen is a very satisfactory gas and the lighter gaseous hydrocarbon such as methane, propane, butane, etc. can be used. However, some of these are not stable in this operation, some provide more explosive effort, some can be pressured to a higher working pressure without danger of pre-explosion, and there are various other factors involved in the choice of the gas. The preferred gas is acetylene because it permits a wider range of gas content in the mixture. It has one disadvantage in that it provides free carbon as a result of the explosion, which tends to fowl the sparking device, etc.

A typical installation will involve the use of a ¼ inch heavy-walled commercial pipe (OD 0.54 ) for the device. These are generally in the range of five to eight feet in length. In general the period between subsequent explosions is of the order of six to seven seconds which is normally a function of the magnetic recording equipment in use, ad also is determined by the time of travel of the seismic waves. A preferred portion of this time interval of 20%–40% is used to flow gas into the earth and there is a period of some fifty milliseconds after the closure of the valve, before the gas is detonated. In operation the ratio of oxygen flow to acetylene is approximately in the ratio of three to two. While the stoichiometrically correct ratio would be two parts acetylene to five parts oxygen, there is a wide range over which it will work, and it has not been necessary to try for closer regulation.

No detailed description has been given of the seismic instrumentation used for recording the reflected seismic waves, since this can be conventional, and is well known in the art. Similarly, the solenoid valves and the timing control are conventional and well known in the art.

In FIG. 1 the lower end of the pipe 16 has been indicated as being pointed with a plurality of small holes drilled through the side wall of the pipe. In certain kinds of soil where the driving is easier, it has been found possible, as shown in FIG. 3, to use a squared-off length of pipe 82 with possibly a shallow pointing, as indicated by 84. In order to prevent the pipe from filling with earth during the driving, a driving member 88 is used, which rests on the top of the pipe 82, and has a cylindrical extension 86 which substantially fills the internal volume of the pipe 82 down to the bottom edge 84. Thus while driving the pipe by striking the top of the plate 88, the pipe is driven into the ground and the internal volume is kept free of earth. After the pipe is driven, the insert is removed, a closure is placed across the top end of the pipe and the operation is then in accordance with the preceding description.

While check valves are shown in the lines 22 and 24, they are primarily for the purpose of preventing the flow of explosive gas mixture back into the valves, where it can be detonated and injure the valves. While it is desirable to use these check valves, they might be unnecessary with the type of control valve where such danger of injury would not be present.

While we have shown the ignition of the explosive gas mixture inside the pipe as occurring at the top end of the pipe, this is simply for convenience, and a different ignition system which may be more complicated and expensive, which will ignite the mixture at the lower end of the pipe could equally well be used.

In FIG. 1 a valve 76 has been indicated for the purpose of venting the inside of the pipe 16 to the atmosphere. When the gas flow is too small, such as when the pipe has just been driven into tight soil, it is difficult to insure an explosive mixture, or even to dissipate the burned gases rapidly enough to allow fresh gases to flow into the pipe. By venting the pipe to the atmosphere through a small opening, which in a sense is a small constant leak, an adequate flow of explosive gas mixture is obtained. This insures a proper mixing of the gases and provision of an explosive gas mixture. By this means, starting of the cavity is greatly simplified under certain soil conditions. After an adequate gas flow has been developed into the formation of the cavity the valve 76 can be closed and the procedure is as described above.

On occasion it is necessary to render the soil more susceptible to the formation of a cavity. This can be done by pumping water, foam, drilling mud, etc. down through the pipe 16 and into the soil. For example, if the soil is too permeable such as when it is a dry, loose sand, a void will not form and a suitable volume of gas will not be retained, unless such fluid is injected into the pores.

Figure 4:
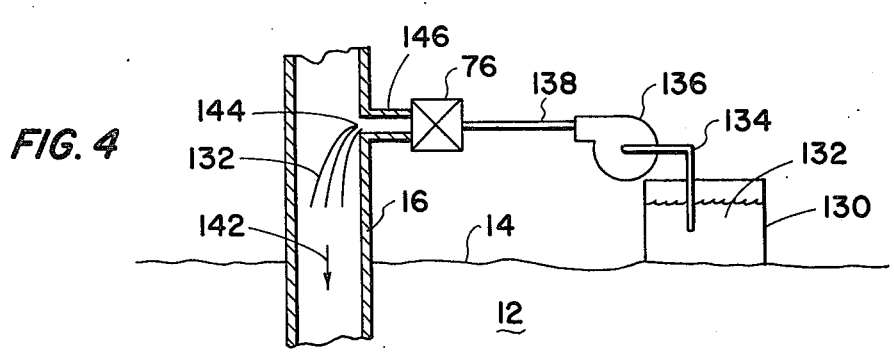
FIG. 4 illustrates a modification of FIG. 1

Reference is made to FIG. 4 which is a modified view of a portion of FIG. 1, including a portion of the pipe 16 driven into the earth 12, and the valve 76 connected by pipe 146 to a small opening 144 in the wall of pipe 16. This small opening is nominally used for venting the spend gases and combustible gases inside the pipe 16, when the earth is relatively impermeable. However, it or another opening can be used for introducing a soil conditioning fluid 132 into the inside of pipe 16, where it falls to the bottom of pipe 16 in accordance with arrow 142, and through the openings 20 into the void space 52 in the earth in the vicinity of pipe 16. This earth conditioning fluid is of well known materials, for the purpose of reducing the permeability of the earth near the pipe. The fluid 132 is pumped from the reservoir 130 carrying a volume 132 of the fluid, by means of intake pipe 134, pump 136 and pipe 138 to valve 76, as is well known in the art.

It has previously been pointed out that a plurality of pipes 16 may be used, in any desired pattern on the earth, with an oxygen-containing gas and a combustible gas supplied to each of them. By filling the multiple pipes substantially simultaneously with the explosive gas mixture and detonating them simultaneously, a total seismic wave is generated of an energy content equal to the sum of the energy generated in the earth by each of the pipes. Thus fewer repetitions of the process of flowing gas, detonating and recording will be required, with a consequent saving in field operating time.

Shown in plan view in FIG. 6 are a plurality of pipes 16A, 16B, ... 16N, each with remote control valves 28 and 34, connected in parallel through pipes 32, 38 to containers 31 and 37, respectively, of oxygen containing gas and combustible gas.

The control conductors 116 and 114 from the plurality of valves go to a control unit 118. Also leads 39 from each of a plurality of spark plugs on 16A, 16B, ... 16N also go to the control 118.

The lead 120 from the recorder 122 is conventional, wherein a signal would normally be received from a switch on a magnetic recording drum to synchronize the switching controls in 118 to the recorder. This is well known in the seismic art and needs no further explanation.

Figure 5:
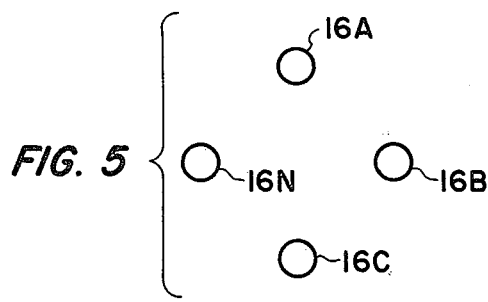

FIG. 6 shows the plurality of pipes 16 in linear array. They can also be a two dimensional array as in the rectangular array of FIG. 5.

While the invention has been described with a certain degree of particularity, it is manifest that many changes may be made in the details of construction and the arrangement of components. It is understood that the invention is not to be limited to the specific embodiments set forth herein by way of exemplifying the invention but the invention is to be limited only by the scope of the attached claim or claims including the full range of equivalency to which each element or step thereof is entitled.

What is claimed:

1. Apparatus for generating seismic waves in the earth comprising:
   a. an elongated pipe of small cross section open at its lower end, the upper end of said pipe being closed, said lower end of said pipe adapted to be driven into the shallow layers of the earth;
   b. means to introduce into the inside of said pipe at said upper end thereof an oxygen containing gas and a combustible gas; said combustible gas forming an explosive mixture with said oxygen-containing gas whereby part of said explosive gas mixture will flow into the shallow layers of the earth; and
   c. means connected to the inside of said pipe to detonate said explosive gas mixture inside said pipe; whereby a detonation wave will progress down said conduit and will detonate said explosive gas mixture in said shallow layers of the earth, thereby forming a cavity in the earth and generating a seismic wave.

2. The seismic source as in claim 1 including at least one opening connected to the inside of said pipe, whereby when said pipe is driven into said shallow layers, said gas mixture can be circulated into said pipe and out through said at least one opening to ensure an explosive mixture in said pipe.

3. The seismic source as in claim 2 in which the rate of flow of oxygen is approximately 1.5 times the rate of flow of acetylene.

4. The seismic source as in claim 1 in which said oxygen containing gas is oxygen and said combustible gas is acetylene.

5. A method of generating seismic waves comprising the steps of:
   a. driving a small diameter conduit into the shallow layers of the earth at a first point;
   b. flowing into and mixing in said conduit an explosive mixture of an oxygen containing gas and a combustible gas;
   c. causing said gases to continuously flow for a selected period of time into and through said conduit into said shallow layers of the earth in the immediate vicinity of said conduit; and
   d. detonating said gas mixture in said conduit so that a detonation wave in said conduit will travel down to and detonate said gas mixture in said shallow layers of the earth;
   whereby a seismic wave will be generated and a cavity will be formed in the earth at said first point in the vicinity of the bottom end of said conduit.

6. The method as in claim 5 including the additional step of detecting and recording, at a second point, distant from said first point, the seismic wave generated at said first point, after travel through the earth.

7. The method as in claim 6 including the additional steps of repeating said flowing of gas mixture into said cavity in the earth, and detoning said gas mixture in said cavity in the earth, until said detecting and recording indicates significantly intense seismic signals representative of the structure of the earth.

8. The method as in claim 5 including the use of a plurality of small diameter conduits and detonating said gas mixtures in the earth simultaneously.

9. The method as in claim 5 in which said conduit has at least one small opening through the wall of said conduit and including the steps of flowing said gas mixture into said conduit and out through said opening, and detonating said explosive mixture in said conduit, whereby said detonation will proceed down said conduit, and form a cavity in the earth at the base of said conduit.

10. A method of claim 5 including after step (a) injecting a soil conditioning fluid into said shallow layers.

11. The seismic source as in claim 1 including a plurality of said elongated pipes in the earth positioned over a selected area, and including means to detonate said explosive gas mixture in each pipe simultaneously.

12. The seismic source as in claim 1 including means to detect and record, at a point distant from said source, the seismic wave generated at said source after travel through the earth.

13. The seismic source as in claim 1 including means to inject into said pipe and into the shallow layers of the earth a sail conditioning fluid to partially close the pores of the earth, and so to confine a volume of explosive gas mixture.

14. The seismic source as in claim 13 in which said sail conditioning fluid is a viscous liquid.

15. The seismic source as in claim 14 in which said sail conditioning fluid is a foam.

16. The seismic source as in claim 14 in which said sail conditioning fluid is a viscous drilling mud.

* * * * *